(12) United States Patent
Huang et al.

(10) Patent No.: US 11,277,006 B2
(45) Date of Patent: Mar. 15, 2022

(54) MODULARIZED INTERCONNECTION DEVICE AND SYSTEM THEREOF

(71) Applicant: ABB Power Grids Switzerland AG, Baden (CH)

(72) Inventors: Xing Huang, Beijing (CN); ChunMing Yuan, Beijing (CN); XiaoBo Yang, Beijing (CN); HaiLian Xie, Beijing (CN); Kai Liu, Beijing (CN)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/298,264

(22) PCT Filed: Nov. 28, 2018

(86) PCT No.: PCT/CN2018/117956
§ 371 (c)(1),
(2) Date: May 28, 2021

(87) PCT Pub. No.: WO2020/107263
PCT Pub. Date: Jun. 4, 2020

(65) Prior Publication Data
US 2021/0391717 A1 Dec. 16, 2021

(51) Int. Cl.
*H02J 3/00* (2006.01)
*G06F 1/26* (2006.01)
*H02J 3/06* (2006.01)
*H02J 13/00* (2006.01)

(52) U.S. Cl.
CPC ............. *H02J 3/001* (2020.01); *G06F 1/263* (2013.01); *H02J 3/06* (2013.01); *H02J 13/00036* (2020.01)

(58) Field of Classification Search
CPC ........ H02J 3/001; H02J 3/06; H02J 13/00036; G06F 1/263
See application file for complete search history.

(56) References Cited

U.S. PATENT DOCUMENTS

| | | | |
|---|---|---|---|
| 8,447,435 B1 | 5/2013 | Miller et al. | |
| 8,649,914 B2 | 2/2014 | Miller et al. | |
| 9,459,643 B2 | 10/2016 | Miller et al. | |

(Continued)

FOREIGN PATENT DOCUMENTS

| | | |
|---|---|---|
| CN | 102938564 A | 2/2013 |
| CN | 105896500 A | 8/2016 |
| CN | 107394819 A | 11/2017 |

*Primary Examiner* — Ziaul Karim
(74) *Attorney, Agent, or Firm* — Slater Matsil, LLP

(57) ABSTRACT

Embodiments of present disclosure relates to a modular interconnection device (MID) and an electrical network system. The MID comprises a modular port assembly, a node, a converter and a local controller. The modular port assembly is configured to transmit alternating current and/or direct current. The node is coupled to an AC source via a first switch and the modular port assembly. The first switch is configured to selectively disconnect the modular interconnection device from the AC source. The converter is coupled to the node via a second switch and coupled to a DC source via a third switch. The converter is configured to convert the AC current into DC current or convert DC current into AC current. The local controller is coupled to the first, second and third switches and configured to control operation of the first, second and third switches.

22 Claims, 9 Drawing Sheets

(56) References Cited

U.S. PATENT DOCUMENTS

| | | | |
|---|---|---|---|
| 2013/0274947 A1* | 10/2013 | Miller | G06F 1/263 |
| | | | 700/297 |
| 2014/0156101 A1 | 6/2014 | Miller et al. | |
| 2017/0003701 A1 | 1/2017 | Miller et al. | |
| 2017/0040819 A1* | 2/2017 | Ono | H02M 3/33507 |
| 2017/0366022 A1* | 12/2017 | Yu | H02J 9/061 |
| 2017/0366029 A1* | 12/2017 | McKenna | H02J 5/00 |

* cited by examiner

MODULARIZED INTERCONNECTION DEVICE AND SYSTEM THEREOF

CROSS-REFERENCE TO RELATED APPLICATIONS

This application is a national stage application of International Application No. PCT/CN2018/117956, filed on Nov. 28, 2018, which application is hereby incorporated herein by reference.

TECHNICAL FIELD

Example embodiments of the present disclosure generally relate to electrical devices and systems, and more particularly, to modularized interconnection device and system.

BACKGROUND

Electrical network is generally constituted by various power sources and transmission lines, and electricity is transmitted over the electrical network and consumed by loads accessing the electrical network.

A global controlling center of the electrical network monitors operation of the electrical network or receives information of condition of the electrical network such that the controlling center may control electricity distribution over the electrical network. For example, the global controlling center may control the electrical network to direct electricity to a place where electrical power is insufficient.

A feeder, generally including an alternating current (AC) or a direct current (DC) power source, may be added in the electrical network in case of power shortage, or may be replaced by a new one in case of fault. CN102938564B describes a closed-loop flexible power distribution system based on DC current. However, such approaches are inconvenient in practice, because they often rely on specific configuration of the electrical network and devices.

SUMMARY

Example embodiments of the present disclosure propose a solution for interconnecting feeders in the electrical network.

In a first aspect, example embodiments of the present disclosure provide modular interconnection device. The modular interconnection device comprises a modular port assembly, a node, a converter and a local controller. The modular port assembly is configured to transmit alternating current and/or direct current. The node is coupled to an AC source via a first switch and the modular port assembly. The first switch is configured to selectively disconnect the modular interconnection device from the AC source. The converter is coupled to the node via a second switch and coupled to a DC source via a third switch. The converter is configured to convert the AC current into DC current or convert DC current into AC current. The local controller is coupled to the first, second and third switches and configured to control operation of the first, second and third switches.

In some embodiments, the modular interconnection device is configured to couple to a further modular interconnection device, and transmit electricity to or receive electricity from the further modular interconnection device. The local controller of the modular interconnection device is configured to communicate with a local controller of the further modular interconnection device or controlling center of a power supply network.

In some embodiments, the first switch is coupled between the modular port assembly and the node.

In some embodiments, the node is further coupled to the modular port assembly via a fourth switch or directly. The local controller is further coupled to the fourth switch and configured to control operation of the fourth switch.

In some embodiments, the modular port assembly comprises a first port, a second port, a third port and a fourth port. The first port is coupled to the first switch and configured to receive the AC current from the AC source or transmit AC current to the AC source. The second port is coupled to the node directly or via a fourth switch, and configured to selectively transmit the AC current between modular interconnection devices. The third port is coupled to the third switch and configured to selectively transmit the DC current between the modular interconnection devices. The fourth port is coupled to the node and configured to transmit the AC current between the modular interconnection devices.

In some embodiments, the modular interconnection device further includes a fifth switch. The fifth switch is coupled to a cable and the local controller and configured to selectively disconnect the cable from the DC sources.

In some embodiments, the local controller is integrated in the converter.

In some embodiments, the local controller is further configured to switch off the first switch in response to receiving information indicating fault of the AC source.

In some embodiments, the local controller is further configured to switch off the second switch in response to receiving information indicating fault of the converter.

In some embodiments, the local controller is further configured to switch on the third switch in response to receiving a request of transmitting DC current from the modular interconnection device to a further modular interconnection device or receiving DC current from the further modular interconnection device to the modular interconnection device.

In some embodiments, the local controller is further configured to switch on the fourth switch in response to receiving a request of a further AC source or a further converter to transmit AC current.

In some embodiments, the local controller is further configured to switch on the fourth switch and switch off the first switch in response to receiving a request of converting reactive AC current from a further AC source.

In some embodiments, the modular interconnection device further comprises a fifth switch. The fifth switch is coupled to the converter and configured to disconnect the converter from DC sources. The modular port assembly comprises a fifth port coupled to the fifth switch and configured to transmit the DC current between the modular interconnection devices. The local controller is further coupled to the fifth switch and configured to control operation of the fifth switch.

In some embodiments, the local controller is further configured to switch on the fifth switch in response to receiving a request of receiving DC current from or transmitting DC current to a further modular interconnection device.

In some embodiments, the local controller is further configured to control the converter to receive or transmit the DC current based on a load redistribution request.

In a second aspect, example embodiments of the present disclosure provide an electrical network system. The electrical network system comprises a first modular interconnection device of the first aspect, a second modular interconnection device of the first aspect selectively coupled to the first modular interconnection device and configured to transmit electrical power between the first and second modular interconnection device.

In some embodiments, the second port of the first modular interconnection device is selectively coupled to the fourth port of the second modular interconnection device.

In some embodiments, the third port of the first modular interconnection device is selectively coupled to the third port of the second modular interconnection device.

In some embodiments, the electrical network system further comprises a third modular interconnection device of the first aspect, the second and fourth ports of the first, second and third modular interconnection devices are coupled in an annular topology.

In some embodiments, the third ports of the first, second and third modular interconnection devices are coupled to a common node.

In some embodiments, the third and fifth ports of the first modular interconnection device of claim 11, the second modular interconnection device of claim 10, and the third modular interconnection device of claim 11 are coupled in an annular topology.

In some embodiments, the electrical network system further comprises an energy storage device coupled to the third port of the first or second modular interconnection device.

According to the embodiments of the present disclosure, the electrical network system may be easily configured, and reliability of the electrical network system may be improved by utilizing the modular interconnection device.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION

Figure 1:
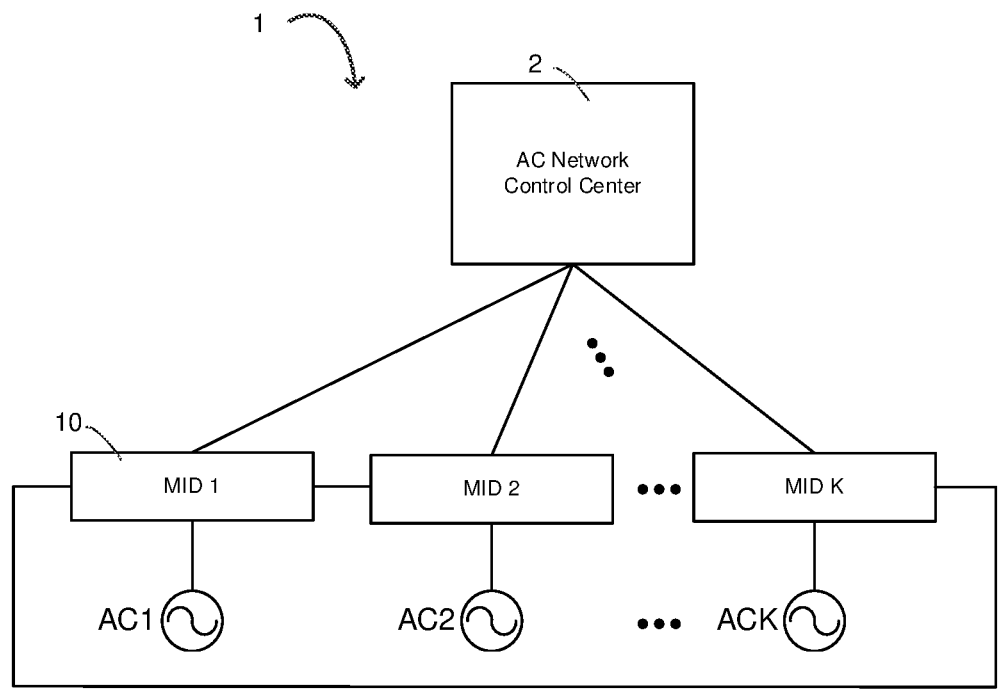
FIG. 1 illustrates a block diagram of an electrical network system in accordance with some example embodiments of the present disclosure.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other definitions, explicit and implicit, may be included below.

As mentioned above, conventional electrical network system is inconvenient to configure, this is because various feeders of various properties may be coupled to the electrical network system, and the conventional electrical network system needs to consider intrinsic properties of the various feeders when incorporating the feeders. In addition, the conventional electrical network system may suffer a complete breakdown when the global controlling center of the electrical network system has a fault. Thus, it is desired to facilitate configuration of the electrical network system, and improve stability of the conventional electrical network system.

FIG. 1 illustrates a block diagram of an electrical network system 1 in accordance with some example embodiments of the present disclosure. The electrical network system 1 includes a plurality of modular interconnection devices (MIDs) 10 each including a local controller. The term "modular interconnection device" herein refers to an interconnection device that has a similar or same architecture including a port assembly achieving similar or same interconnecting function, and can be coupled to and replaced by each other. The term "local controller" herein refers to the controller in the MID device, instead of a global controller commonly shared by the conventional electrical network system.

The MID 10 may couple to an AC power supply. Although each MID in FIG. 1 is illustrated to couple to an AC power supply, this is only for illustration without suggesting any limitations as to the scope of the subject matter described here. For example, a MID may share an AC power supply via another MID. In an example, the MID2 in FIG. 1 may disconnect from the power supply AC2, and shares the power supply AC1 with MID 1. Details for the interconnection will be described below.

The electrical network system 1 includes a global AC network controlling center 2. The controlling center 2 may collect information from the plurality of MIDs or other sensing nodes in the electrical network system, and controls operation of the MIDs by transmitting instructions to the MIDs. In case that a further MID is needed in the electrical network system 1, the AC network control center 2 may control certain MIDs, usually the MIDs to which the further MID will be coupled, to temporarily disable, and enable the disabled MIDs and the further MIDs upon successfully coupling the further MID to the disabled MIDs.

In case that a MID is needed to be removed from the electrical network system 1, the AC network control center 2 may control certain MIDs, usually the MIDs to which the MID is being coupled, to temporarily disable, and enable the disabled MIDs upon successfully coupling the disabled MIDs and/or incorporating a new MID. In case that the global AC network controlling center 2 fails or loses communication with the MIDs, at least one controller in the MIDs may operates a temporary host controller, and other controllers may communicate with the host controller for proper operation of the electrical network system 1.

By incorporating a local controller in the MID, the MIDs may properly operate even if the global AC network controlling center fails. Also, even if a controller or some controllers of MIDs fail, no complete breakdown of the electrical system will occur.

Moreover, the conventional approach includes only one global network controlling center, which is often distant from feeders. Thus, conventional approach cannot provide fast or instant responses to the variation of the electrical network due to long communication distances and heavy communication traffic load.

By providing a local controller in a MID, the local controller may take care of the MID without communicating all the information to the global AC network controlling center. This will significantly reduce communication traffic load, and fast or instant responses to the variation of the electrical network may be achieved due to short communication distances. In some cases, there is no communication outside the MID. Also, more comprehensive and flexible operation of the MID can be implemented with the local controller, as described below.

Figure 2:
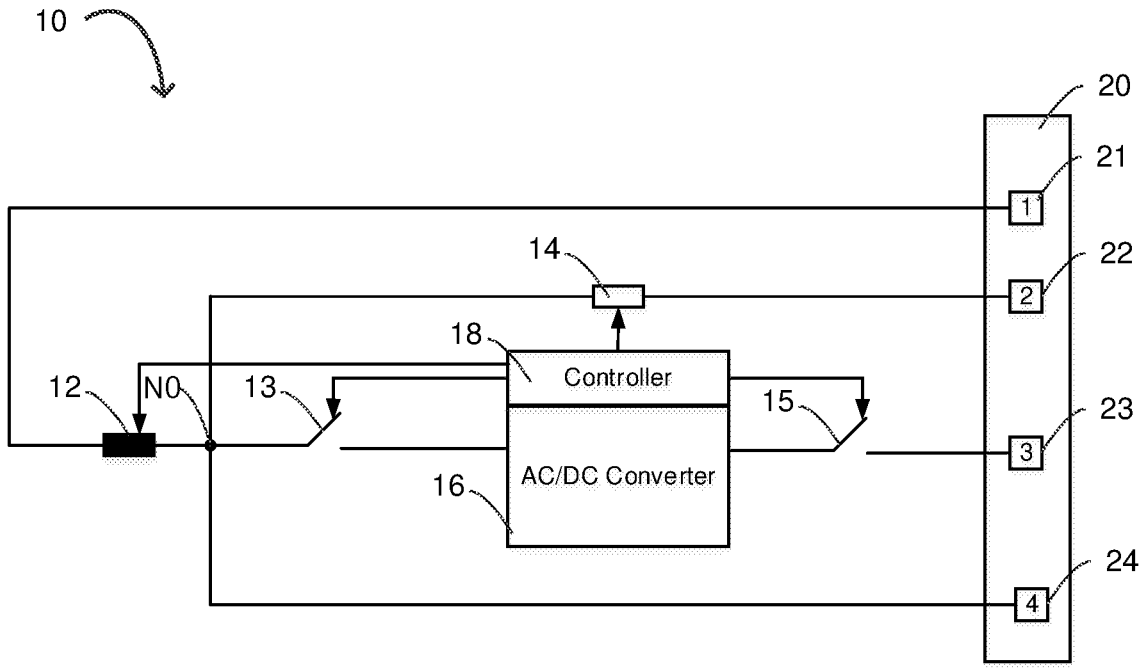
FIG. 2 illustrates a block diagram of a modular interconnection device in accordance with some example embodiments of the present disclosure.

FIG. 2 illustrates a block diagram of a modular interconnection device 10 in accordance with some example embodiments of the present disclosure. The modular interconnection device 10 includes a first switch 12, a second switch 13, a third switch 15, a fourth switch 14, a local controller 18, an AC/DC converter 16 and a port assembly 20. Although the first, second, third and fourth switches are illustrated in the modular interconnection device 10, this is only for illustration without suggesting any limitations as to the scope of the subject matter described here. Some of the switches may be provided independently and outside the modular interconnection device 10. For example, the first switch may be provided outside the modular interconnection device 10, and is coupled between a first port 21 of the port assembly 20 and the AC power source.

Figure 15:
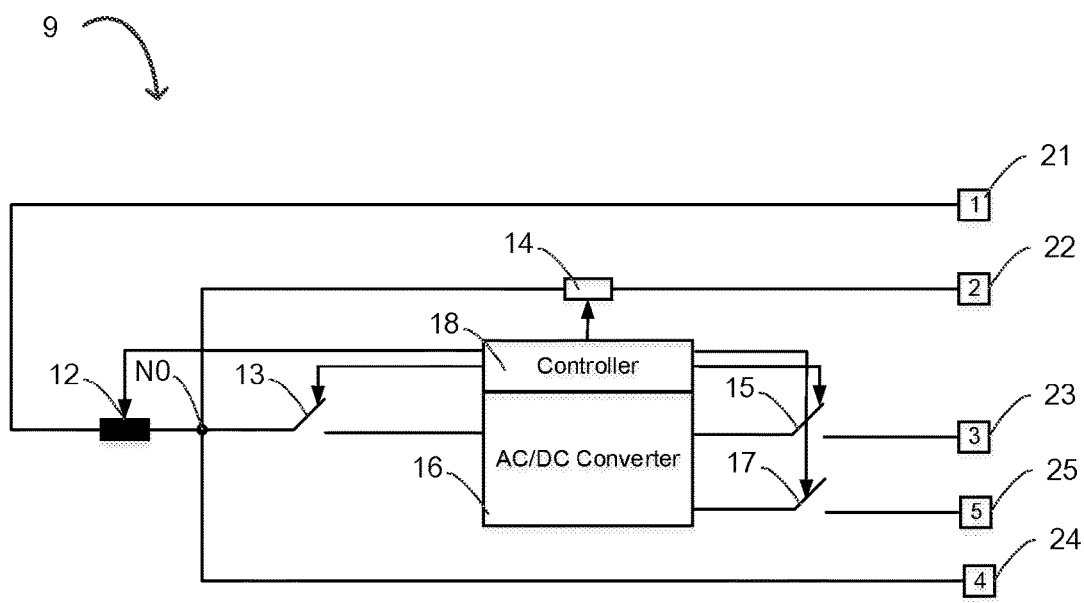
FIG. 15 illustrates a block diagram of a modular interconnection device in accordance with some further example embodiments of the present disclosure.

The port assembly 20 includes a first port 21, a second port 22, a third port 23 and a fourth port 24. Although four ports are illustrated in FIG. 2, this is only for illustration without suggesting any limitations as to the scope of the subject matter described here. Less and more ports in the port assembly may be provided. For example, FIG. 15 shows a port assembly including five ports, and will be described below. Although the four ports are illustrated in the single port assembly 20 in FIG. 2, this is only for illustration without suggesting any limitations as to the scope of the subject matter described here. For example, the port assembly 20 may include the four ports disposed on different surfaces of the MID 10.

The local controller 18 is configured to collect information of conditions of MID, including power condition, switch condition and so on, and controls operation of the switches. In addition, the local controller 18 may also control operation of the AC/DC converter 16. Although the local controller 18 is illustrated independently, this is only for illustration without suggesting any limitations as to the scope of the subject matter described here. For example, the local controller 18 may be incorporated into the controller of the AC/DC converter 16 for saving cost.

The AC/DC converter 16 is configured to convert AC current into DC current or convert DC current into AC current. For example, in case of converting AC current to DC current, the AC/DC converter 16 may receive AC current via the first port 21, the switched-on switch 12, the node NO, and the switched-on switch 13, and convert the AC current into DC current. Then, the DC current may be transmitted to other MID via the switched-on switch 15. For example, in case of converting DC current to AC current, the AC/DC converter 16 may receive DC current via the switched-on switch 15, and convert the DC current into AC current. Then, the AC current may be transmitted to other MID via the switched-on switch 13, the node NO, the switched-on switch 12 and the first port 21. Although two general conversion approaches are described, this is only for illustration without suggesting any limitations as to the scope of the subject matter described here. Details for conversion and transmission will be described below.

The first switch 12 is coupled to an AC source and configured to selectively transmit AC current. Also, the first switch 12 is further configured to disable or isolate the MID 10 from the AC source in case that the MID 10 is to be replaced or the AC source or the MID 10 fails. The second switch 13 is coupled between the node NO and the AC/DC converter 16, and is configured to selectively conduct AC current and disable or isolate the converter 16 from the MID 10 in case that the AC/DC converter 16 fails.

The third switch 15 is coupled between the AC/DC converter 16 and the third port 23, and is configured to selectively conduct DC current and isolate the DC link between the MID 10 and other MIDs. The fourth switch 14 is coupled between the node NO and the second port 22, and is configured to selectively conduct AC current with another MID. The fourth switch 14 is generally a normally-open-point (NOP) switch. Although the fourth switch 14 is illustrated in the MID 10, this is only for illustration without suggesting any limitations as to the scope of the subject matter described here. For example, the MID 10 may include no fourth switch 14 by connecting the node NO directly to the second port 22, and a conventional NOP switch may couple to the second port 22 of the MID 10 and is controlled by the local controller 18 of the MID 10.

In addition, the node NO may directly couple to the fourth port 24 and is configured to transmit AC current between different MIDs. Although the node NO is illustrated to directly couple to the fourth port 24, this is only for illustration without suggesting any limitations as to the scope of the subject matter described here. For example, the node NO may couple to the fourth port 24 via a further switch, and the local controller 18 controls operation of the further switch.

Figure 3:
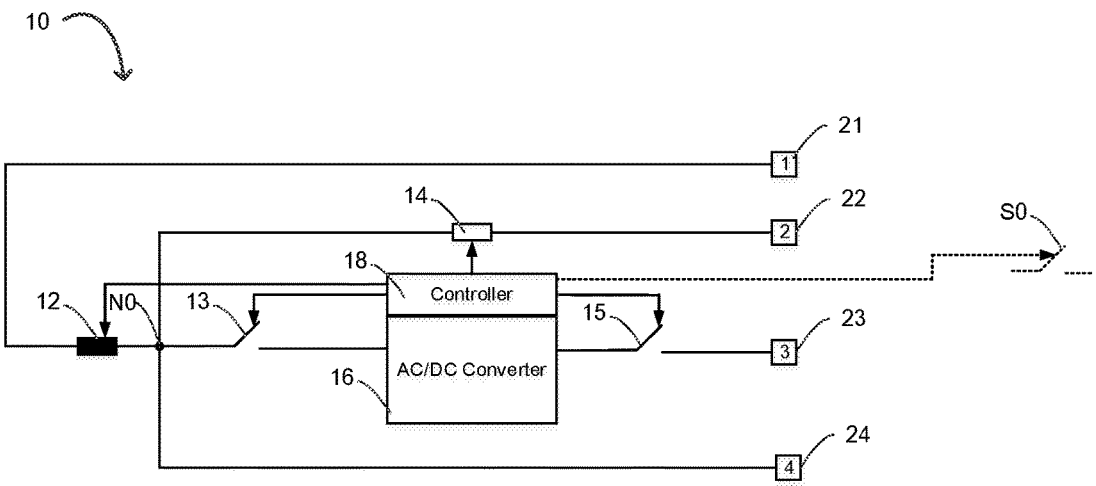
FIG. 3 illustrates a block diagram of a modular interconnection device in accordance with some further example embodiments of the present disclosure.

FIG. 3 illustrates a block diagram of a modular interconnection device 10 in accordance with some further example embodiments of the present disclosure. The MID 10 in FIG. 3 is similar to the MID 10 in FIG. 2 except for incorporation of a fifth switch S0. The fifth switch S0 may be provided independent from the MID 10, and is controlled by the local controller 18 via a cable communication or wirelessly. The fifth switch S0 is coupled to a cable for transmitting DC current, and is configured to selectively disconnect the cable from electrical network for potential energy loss.

Figure 4:
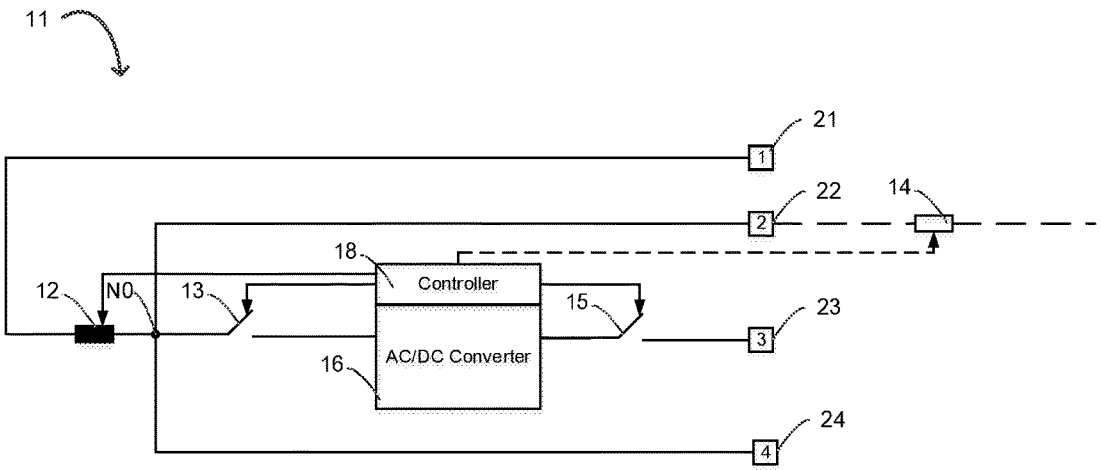
FIG. 4 illustrates a block diagram of a modular interconnection device in accordance with some further example embodiments of the present disclosure.

FIG. 4 illustrates a block diagram of a modular interconnection device 10 in accordance with some further example embodiments of the present disclosure. The MID 10 in FIG. 4 is similar to the MID 10 in FIG. 2 except for location of the fourth switch 14. In FIG. 4, the fourth switch 14 is located outside the MID 10. The fourth switch 14 may be provided independent from the MID 10, but is controlled by the local controller 18. As an alternative, the fourth switch 14 may be provided by conventional NOP switch that exists in the electrical network system.

Figure 5:
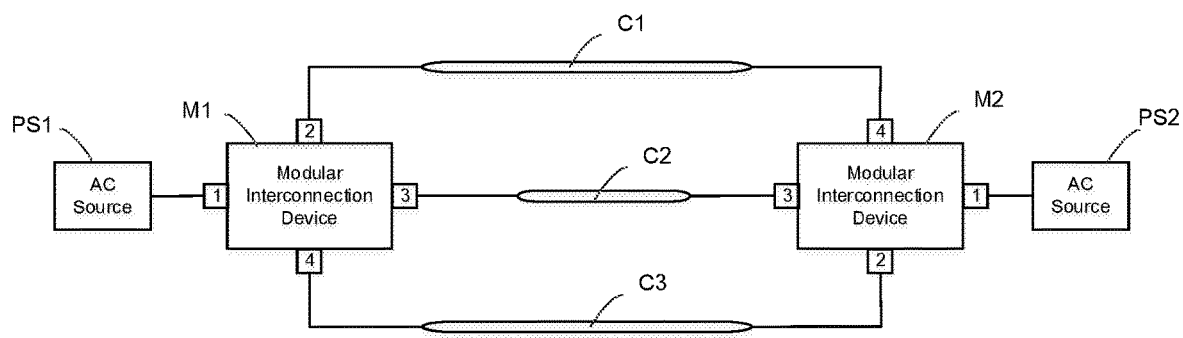
FIG. 5 illustrates a block diagram of an electrical network system of two MIDs in accordance with some example embodiments of the present disclosure.

Details of operation of MIDs and configuration of electrical network system will be described below. FIG. 5 illustrates a block diagram of an electrical network system of two MIDs in accordance with some example embodiments of the present disclosure. The electrical network system may include at least two MIDs, and the feeders can be interconnected by properly coupling the ports of the MIDs. The MIDs M1 and M2 may be instances of the MID 10 in FIG. 2. It could be understood that the MID 10 in FIGS. 3 and 4 can apply to the configuration of FIG. 5 too.

The MID M1 including four ports is coupled to the MID M2 including four ports via cables C1, C2 and C3. The cables C1, C2 and C3 may include long distance cable for transmitting current. The AC source PS1 is coupled to the first port of the MID M1, and the AC source PS2 is coupled to the first port of the MID M2. The second port of the MID M1 is coupled to the fourth port of the MID M2 via the cable C1, and the fourth port of the MID M1 is coupled to the second port of the MID M2 via the cable C3. The third port of the MID M1 is coupled to the third port of the MID M2 via the cable C2.

Although the AC source PS1 is illustrated to directly couple to the first port of the MID M1, this is only for illustration without suggesting any limitations as to the scope of the subject matter described here. For example, the AC source PS1 may couple to the first port of the MID M1 via the first switch, which is provided outside the MID M1. Similarly, the AC source PS2 may couple to the first port of the MID M2 via the first switch.

Although the second port of the MID M1 is illustrated to directly couple to the cable C1, this is only for illustration without suggesting any limitations as to the scope of the subject matter described here. For example, the second port of the MID M1 may couple to the cable C1 via the fourth switch, which is provided outside the MID M1. Similarly, the second port of the MID M2 may couple to the cable C3 via the fourth switch.

Generally, the fourth switches in MIDs M1 and M2 are NOP switches, and there is no AC current transmission between the MIDs M1 and M2. However, in some instances, AC current needs to be transmitted between the MIDs M1 and M2.

For example, in case that the AC source PS2 fails, the local controller 18 of the MID M2 switches off the first switch 12 in response to receiving information indicating fault of the AC source PS2. Also, the fourth switch of the MID M1 may be switched on by the local controller 18 of the MID M1, such that the AC current from the AC source PS1 may transmit via the node NO and the fourth switch 14 of the MID M1 to the AC/DC converter 16 or the AC source PS2 via the node NO of the MID M2.

Also, in case that the AC source PS1 fails, the local controller 18 of the MID M1 switches off the first switch 12 in response to receiving information indicating fault of the AC source PS1. Also, the fourth switch of the MID M2 may be switched on by the local controller 18 of the MID M2, such that the AC current from the AC source PS2 may transmit via the node NO and the fourth switch 14 of the MID M2 to the AC/DC converter 16 or the AC source PS1 via the node NO of the MID M1.

In case that that the AC/DC converter 16 of the MID M2 fails, the local controller 18 of the MID M2 switches off the second switch 13 in response to receiving information indicating fault of the converter 16. In addition, the local controller 18 of the MID M2 may switch off the second switch 15 of the MID M2 in response to receiving information indicating fault of the converter 16 if the second switch 15 has not been switched off. Also, the fourth switch 14 of the MID M2 may be switched on by the local controller 18 of the MID M2, such that the AC current from the AC source PS2 may be shared by the MID M1.

In case that that the AC/DC converter 16 of the MID M1 fails, the local controller 18 of the MID M1 switches off the second switch 13 in response to receiving information indicating fault of the converter 16. In addition, the local controller 18 of the MID M1 may switch off the second switch 15 of the MID M1 in response to receiving information indicating fault of the converter 16 if the second switch 15 has not been switched off. Also, the fourth switch 14 of the MID M1 may be switched on by the local controller 18 of the MID M1, such that the AC current from the AC source PS1 may be shared by the MID M2.

In case that DC current needs to be transmitted from the MID M1 to the MID M2, the MID M2 may send a request to the global AC network controlling center 2 or the MID M1 for transmitting DC current from the MID M1 to the MID M2, and may switches on the third switch 15 of the MID M2 after sending the request. The local controller 18 of the MID M1 switches on the third switch 15 of the MID M1 in response to receiving a request of transmitting the DC current from the MID M1 to the MID M2.

As an alternative, the MID M1 may send a request to the global AC network controlling center 2 or the MID M2 for receiving DC current from the MID M2 to the MID M1, and may switches on the third switch 15 of the MID M1 after sending the request. The local controller 18 of the MID M2 switches on the third switch 15 of the MID M2 in response to receiving the request of transmitting the DC current from the MID M2 to the MID M1.

In an example, a predetermined amount of power needs to be transmitted from the MID M1 to the MID M2, the local controller 18 of the MID M1 controls the second and third switches 13 and 15 of the MID M1 to switch on, convert the predetermined amount of power from AC to DC, based on the request from the MID M2, and transmit the predetermined power via the cable C2 to the MID M2, which has switched on the third switch 15 of the MID M2 for receiving the power.

Similarly, a predetermined amount of power needs to be transmitted from the MID M2 to the MID M1, the local controller 18 of the MID M2 controls the second and third switches 13 and 15 of the MID M2 to switch on, and convert the predetermined amount of power from AC to DC, based on the request information from the MID M1, and transmit the predetermined power via the cable C2 to the MID M1, which has switched on the third switch 15 of the MID M1 for receiving the power.

It is to be understood that, the above examples are described with respect to active mode. In a reactive mode, the configuration of FIG. 5 also applies. For example, in case that the AC source PS2 fails, the local controller 18 of the MID M2 switches off the first switch 12 of the MID M2, and switches on the second switch 13 of the MID M2. The local controller 18 of the MID M1 switches on the first switch 12, the second switch 13 and the fourth switch 14 of the MID M1, and switches off the third switch 15 of the MID M1. In this case, the two-MID system can operate in a reactive mode even if one of the AC sources fails.

In another example, in case that the AC/DC converter 16 of the MID M1 fails, the local controller 18 of the MID M1 switches on the first and fourth switches 12 and 14 of the MID M1, and switches off the second and third switches of the MID M1. The local controller 18 of the MID M2 switches on the second switch 13 of the MID M2, and switches off the first switch 12 of the MID M2. In this case, the two-MID system can operate in a reactive mode even if one of the AC/DC converters fails.

It can be seen that the MID and the system configured with the MID herein are easy to implement and can be applied both to active and reactive modes, because all the MIDs are modular and controlled by respective local controller. In practical field, only the port assembly needs to be correctly connected.

Although only the two MIDs are illustrated in FIG. 5, this is only for illustration without suggesting any limitations as to the scope of the subject matter described here. For example, the two MIDs may transmit operation condition to the global AC network controlling center 2, and operate based on instruction from the global AC network controlling center 2. For example, the global AC network controlling center 2 may instruct the MID M1 to transmit a predetermined amount of power to the MID M2, based on load information transmitted from the MIDs to the global AC network controlling center 2.

In another example, the global AC network controlling center 2 may instruct the MID M1 to share the AC source PS1 with the MID M2, based on fault information of the AC source PS2 transmitted from the MID M2 to the global network controller. In yet another example, the global AC network controlling center 2 may receive a request of requiring a predetermined amount of power from the MID M1, and the global AC network controlling center 2 may instruct the MID M2 to provide the predetermined amount of power via the cable C2 to MID M1.

Figure 6:
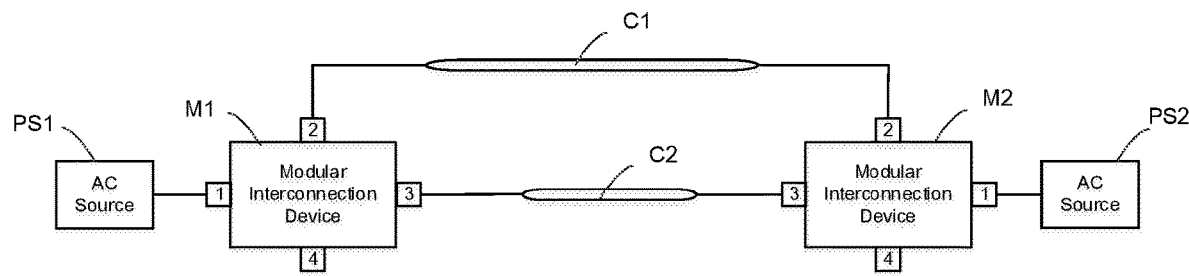
FIG. 6 illustrates a block diagram of an electrical network system of two MIDs in accordance with some further example embodiments of the present disclosure.

FIG. 6 illustrates a block diagram of an electrical network system of two MIDs in accordance with some further example embodiments of the present disclosure. The configuration of FIG. 6 is similar to the configuration of FIG. 5 except for AC cable link between the two MIDs. Thus, description for analogous features will be omitted here for conciseness.

The second port 21 of the MID M1 is coupled via a long distance cable C1 with the second port 21 of the MID M2. The configuration of FIG. 6 is feasible, because one long distance cable for AC current transmission will be sufficient in a two-MID system. For example, although two long distance cables are illustrated in the configuration of FIG. 5, only one cable is sufficient, the other one may operates as a backup. In this event, all operations described with respect to FIG. 5 may apply to the configuration of FIG. 6.

Figure 7:
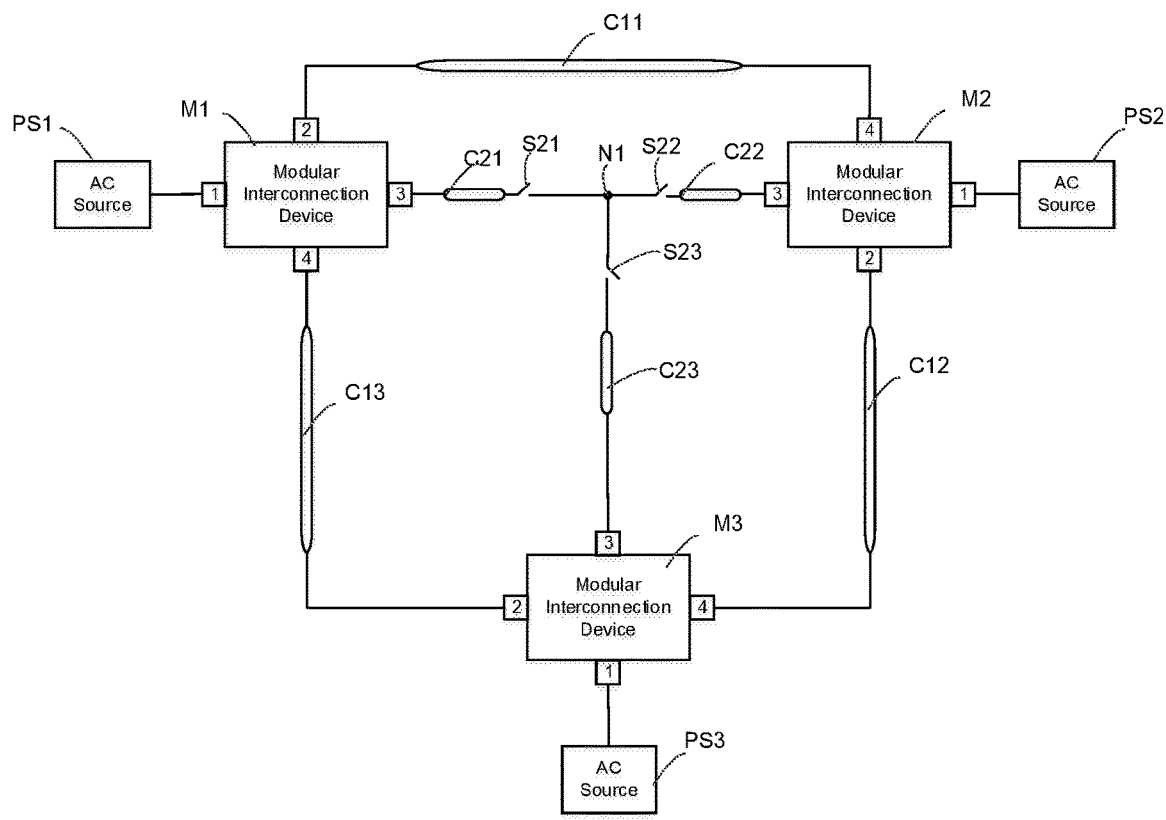
FIG. 7 illustrates a block diagram of an electrical network system of three MIDs in accordance with some example embodiments of the present disclosure.

FIG. 7 illustrates a block diagram of an electrical network system of three MIDs in accordance with some example embodiments of the present disclosure. The configuration of FIG. 7 may be expanded from the two-MID system of FIG. 5. For example, in case that a new feeder needs to incorporate into the system of FIG. 5, the local controllers may temporally pause operation by switching off all the switches. Operators may then disconnect some connection between the MIDs M1 and M2, and couple the MID M3 to the MIDs M1 and M2.

It can be seen that operator only needs to disconnect the original cable from the ports, and then couple the cables to correct ports of the MIDs when expanding the electrical network system. Thus, it is easy for operators to operate in field. The electrical network system may include three MIDs, and the feeders can be interconnected by properly coupling the ports of the MIDs. The MIDs M1, M2 and M3 may be instances of the MID 10 in FIG. 2. It could be understood that the MID 10 in FIGS. 3 and 4 can apply to the configuration of FIG. 7 too.

The second port of the MID M1 is coupled to the fourth port of the MID M2, the second port of the MID M2 is coupled to the fourth port of the MID M3, and the second port of the MID M3 is coupled to the fourth port of the MID M1. It can be seen that the second and fourth ports of the first, second and third MIDs M1, M2 and M3 are coupled in an annular topology.

Each first port of the MIDs M1, M2 and M3 are coupled to a respective AC source. The third ports of the MIDs M1, M2 and M3 are coupled to a common node N1 via a serial connection of a long distance cable and a switch controlled by respective local controller. The switch in the serial connection may be an instance of the fifth switch S0 in FIG. 3. By this configuration, AC current may be transmitted over the cables C11, C12 and C13, and DC current may be transmitted over the cables C21, C22 and C23, as needed.

For example, in case that the AC source PS3 fails, the AC/DC converter of the MID M3 may receive AC current from the AC sources PS1 and PS2 by switching off the first switch of the MID M3, and switching on the second and fourth switches of the MID M3 and the fourth switch of the MID M2.

In case that the AC/DC converter of the MID M3 fails, the AC/DC converters of the MIDs M1 and M2 may receive AC current from the AC source PS3 by switching off the second and third switches of the MID M3, and switching on the first and fourth switches of the MID M3 and the fourth switch of the MID M2. In case that a first predetermined amount of power needs to be transmitted from the MID M1 to the MID M3, and a second predetermined amount of power needs to be transmitted from the MID M2 to the MID M3, the switches S21, S22 and S23 may be switched on by respective local controller such that the first and second amounts of power may be transmitted from the AC/DC converters of the MIDs M1 and M2 to the AC/DC converters of the MID M3.

It is to be understood that, the above examples are described with respect to active mode. In a reactive mode, the configuration of FIG. 7 also applies. For example, the first switches of the second and third MIDs M2 and M3 are switched off, and the first switch of the first MID M1 is switched on. The second switches of the second and third MIDs M2 and M3 are switched on, and the second switch of the first MID M1 is switched off. All the fourth switches of the MIDs M1-M3 are switched on, and all the third switches of the MIDs M1-M3 are switched off. In this case, all the AC/DC converters in the electrical network system are coupled to the AC source PS1, and may operate in a static synchronous compensator (STATCOM) reactive mode.

Although the reactive mode are described with reference to the two-MID system of FIG. 5 and the three-MID system of FIG. 7, this is only for illustration without suggesting any limitations as to the scope of the subject matter described here. It could be understood that the reactive operation, such as the STATCOM operation, may extend to an electrical network system including more MIDs by selectively operating the switches to couple more AC/DC converters to one AC source.

Although some aspects of the three-MID system have been described with respect to FIG. 7, this is only for illustration without suggesting any limitations as to the scope of the subject matter described here. Features described with respect the two-MID electrical system may analogously applied to the three-MID electrical network system by appropriately switching on/off switches.

Figure 8:
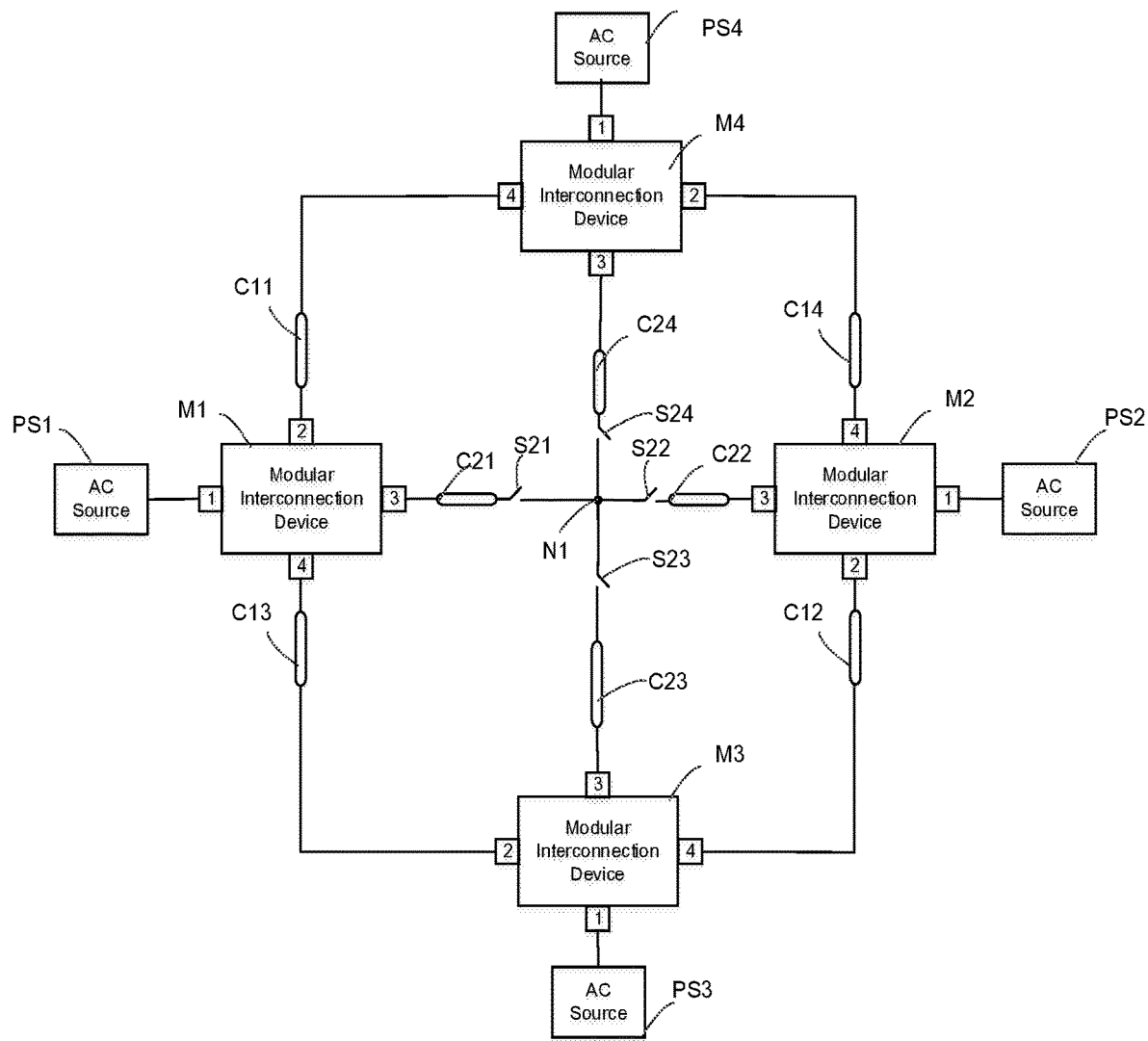
FIG. 8 illustrates a block diagram of an electrical network system of four MIDs in accordance with some example embodiments of the present disclosure.

FIG. 8 illustrates a block diagram of an electrical network system of four MIDs in accordance with some example embodiments of the present disclosure. The configuration of FIG. 8 may be expanded from the three-MID system of FIG. 7. For example, in case that a new feeder needs to incorporate into the system of FIG. 7, the local controllers may temporally pause operation by switching off all the switches. Operators may then disconnect some connection among the MIDs M1, M2 and M3, and couple the MID M4 to the MIDs M1, M2 and M3.

It can be seen that operator only needs to disconnect the original cable from the ports, and then couple the cables to correct ports of the MIDs when expanding the electrical network system. Thus, it is easy for operators to operate in field. The electrical network system may include four MIDs, and the feeders can be interconnected by properly coupling the ports of the MIDs. The MIDs M1, M2, M3 and M4 may be instances of the MID 10 in FIG. 2. It could be understood that the MID 10 in FIGS. 3 and 4 can apply to the configuration of FIG. 8 too.

The second port of the MID M1 is coupled to the fourth port of the MID M4, the second port of the MID M4 is coupled to the fourth port of the MID M2, the second port of the MID M2 is coupled to the fourth port of the MID M3, and the second port of the MID M3 is coupled to the fourth port of the MID M1. It can be seen that the second and fourth ports of the first, second, third and fourth MIDs M1, M2, M3 and M4 are coupled in an annular topology for transmitting AC current among these feeders.

Each first port of the MIDs M1, M2, M3 and M4 is coupled to a respective AC source. The third ports of the first, second, third and fourth MIDs M1, M2, M3 and M4 are coupled to a common node N1 via a serial connection of a long distance cable and a switch controlled by respective local controller. The switch in the serial connection may be an instance of the fifth switch S0 in FIG. 3. By this configuration, AC current may be selectively transmitted over the cables C11, C12, C13 and C14, and DC current may be selectively transmitted over the cables C21, C22, C23 and C24, as needed.

For example, in case that the AC source PS3 fails, the AC/DC converter of the MID M3 may receive AC current from the AC sources PS1 and PS2 by switching off the first switch of the MID M3, and switching on the second and fourth switches of the MID M3 and the fourth switch of the MID M2, while switching off the second switches of the MIDs M1 and M4.

In case that the AC/DC converter of the MID M3 fails, the AC/DC converters of the MIDs M1 and M2 may receive AC current from the AC source PS3 by switching off the second and third switches of the MID M3 and switching on the first and fourth switches of the MID M3 and the fourth switch of the MID M2, while switching off the fourth switches of the MIDs M1 and M4. In case that a first predetermined amount of power needs to be transmitted from the MID M1 to the MID M3, and a second predetermined amount of power needs to be transmitted from the MID M2 to the MID M3, the switches S21, S22 and S23 may be switched on by respective local controllers, and the switch S24 may be switched off by the local controller of the MID M4, such that the first and second amounts of power may be transmitted from the AC/DC converters of the MIDs M1 and M2 to the AC/DC converters of the MID M3 without flowing into the AC/DC converter of the MID M4.

Although some aspects of the four-MID system have been described with respect to FIG. 8, this is only for illustration without suggesting any limitations as to the scope of the subject matter described here. Features described with respect the two-MID or three-MID electrical network system may analogously applied to the four-MID electrical network system by appropriately switching on/off switches.

Figure 9:
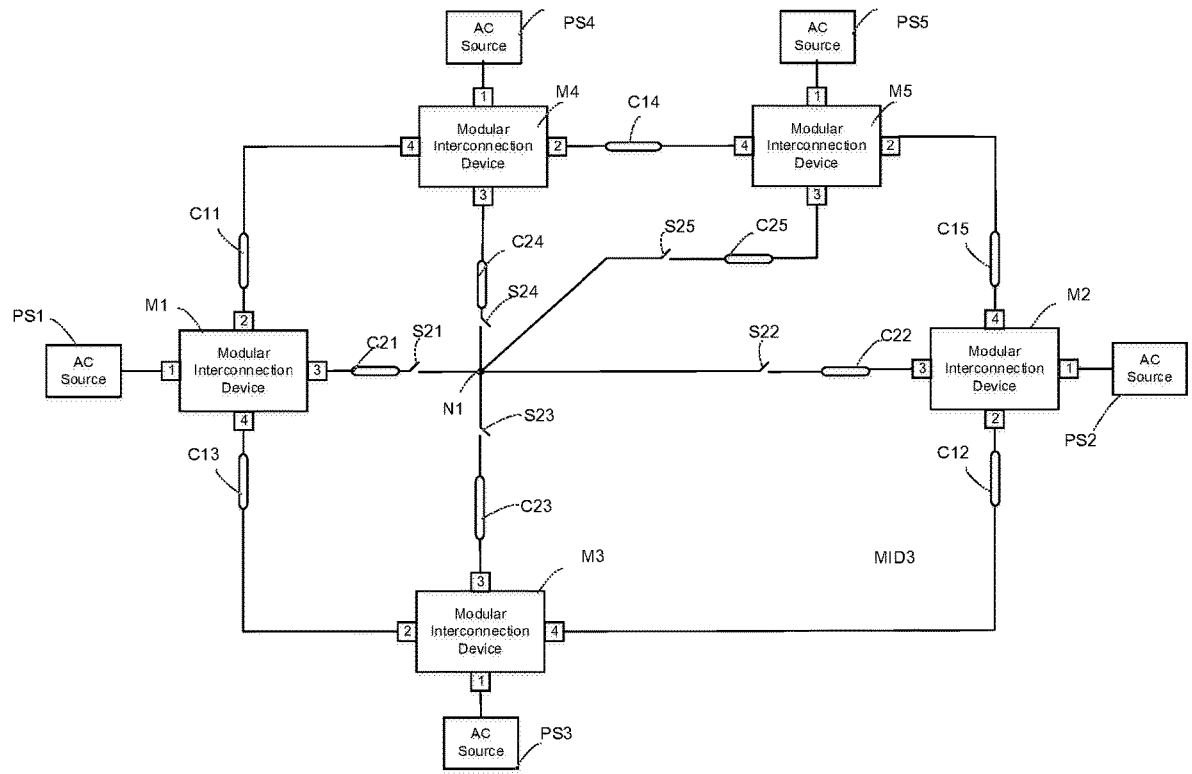
FIG. 9 illustrates a block diagram of an electrical network system of five MIDs in accordance with some example embodiments of the present disclosure.

FIG. 9 illustrates a block diagram of an electrical network system of five MIDs in accordance with some example embodiments of the present disclosure. The configuration of FIG. 9 may be expanded from the three-MID system of FIG. 8. For example, in case that a new feeder needs to incorporate into the system of FIG. 8, the local controllers may temporally pause operation by switching off all the switches. Operators may then disconnect some connection among the MIDs M1, M2, M3 and M4, and couple the MID M5 to the MIDs M1, M2, M3 and M4.

It can be seen that operator only needs to disconnect the original cable from the ports, and then couple the cables to correct ports of the MIDs when expanding the electrical network system. Thus, it is easy for operators to operate in field. The electrical network system may include four MIDs, and the feeders can be interconnected by properly coupling the ports of the MIDs. The MIDs M1, M2, M3, M4 and M5 may be instances of the MID 10 in FIG. 2. It could be understood that the MID 10 in FIGS. 3 and 4 can apply to the configuration of FIG. 9 too.

The second port of the MID M1 is coupled to the fourth port of the MID M4, the second port of the MID M4 is coupled to the fourth port of the MID M5, the second port of the MID M5 is coupled to the fourth port of the MID M2, the second port of the MID M2 is coupled to the fourth port of the MID M3, and the second port of the MID M3 is coupled to the fourth port of the MID M1. It can be seen that the second and fourth ports of the first, second, third and fourth MIDs M1, M2, M3, M4 and M5 are coupled in an annular topology for transmitting AC current among these feeders.

Each first port of the MIDs M1, M2, M3, M4 and M5 is coupled to a respective AC source. The third ports of the first, second, third and fourth MIDs M1, M2, M3, M4 and M5 are coupled to a common node N1 via a serial connection of a long distance cable and a switch controlled by respective local controller. The switch in the serial connection may be an instance of the fifth switch S0 in FIG. 3. By this configuration, AC current may be selectively transmitted over the cables C11, C12, C13, C14 and C15, and DC current may be selectively transmitted over the cables C21, C22, C23, C24 and C25, as needed.

For example, in case that the AC source PS3 fails, the AC/DC converter of the MID M3 may receive AC current from the AC sources PS1 and PS2 by switching off the first switch of the MID M3, and switching on the second and fourth switches of the MID M3 and the fourth switch of the MID M2, while switching off the second switches of the MIDs M1, M4 and M5.

In case that the AC/DC converter of the MID M3 fails, the AC/DC converters of the MIDs M1 and M2 may receive AC current from the AC source PS3 by switching off the second and third switches of the MID M3 and switching on the first and fourth switches of the MID M3 and the fourth switch of the MID M2, while switching off the fourth switches of the MIDs M1, M4 and M5.

In case that a first predetermined amount of power needs to be transmitted from the MID M1 to the MID M3, and a second predetermined amount of power needs to be transmitted from the MID M2 to the MID M3, the switches S21, S22 and S23 may be switched on by respective local controllers, and the switches S24 and S25 may be switched off by the local controllers of the MIDs M4 and M5, such that the first and second amounts of power may be transmitted from the AC/DC converters of the MIDs M1 and M2 to the AC/DC converters of the MID M3 without flowing into the AC/DC converters of the MIDs M4 and M5.

Although some aspects of the five-MID system have been described with respect to FIG. 9, this is only for illustration without suggesting any limitations as to the scope of the subject matter described here. Features described with respect the two-MID, three-MID or four-MID electrical network system may analogously applied to the five-MID electrical network system by appropriately switching on/off switches.

Although two-MID, three-MID, four-MID and five-MID electrical network systems are illustrated in FIG. 5-9, this is only for illustration without suggesting any limitations as to the scope of the subject matter described here. It is to be understood that the embodiments may analogously be applied to an electrical network systems including more than five MIDs, based on the above description of expanding the electrical system by incorporating a new feeder.

Figure 10:
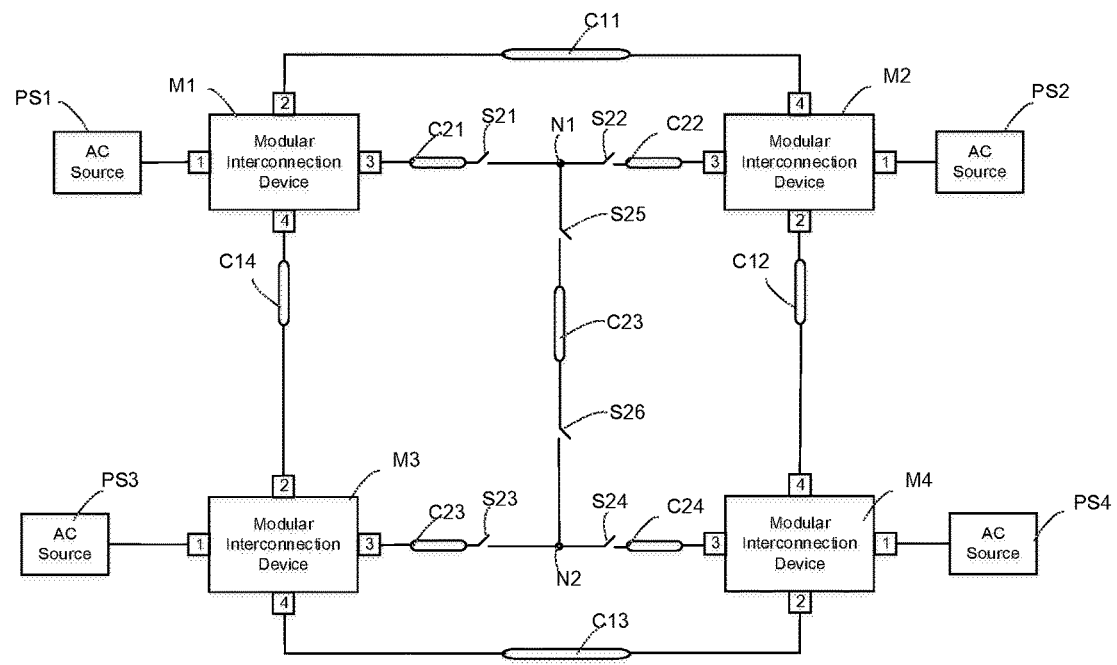
FIG. 10 illustrates a block diagram of an electrical network system of four MIDs in accordance with some further example embodiments of the present disclosure.

FIG. 10 illustrates a block diagram of an electrical network system of four MIDs in accordance with some further example embodiments of the present disclosure. The four-MID electrical network system in FIG. 10 is similar to the four-MID electrical network system in FIG. 8 except for the DC link among the MIDs. Thus, description for analogous features will be omitted here for conciseness.

The third ports of the first and second MIDs M1 and M2 are coupled to a first common node N1, and the third ports of the third and fourth MIDs M3 and M4 are coupled to a second common node N2. The first and second common nodes N1 and N2 are coupled to each other via switches S25 and S26, and the long distance cable S26. The switches S25 and S26 may be controlled by any of the local controller of the MIDs M1-M4 or the AC network controlling center 2. By this configuration, the MIDs M1 and M2 form a first DC pair, and the MIDs M3 and M4 form a second DC pair.

In an example, first DC current may be transmitted between the first DC pair of MIDs, and second DC current may be transmitted between the second DC pair of MIDs in parallel to the first DC current. In another example, DC current may be transmitted from any MID to any other MID as long as the DC switches are appropriately operated. By adding a second node, the DC current distribution may be more flexible.

Figure 11:
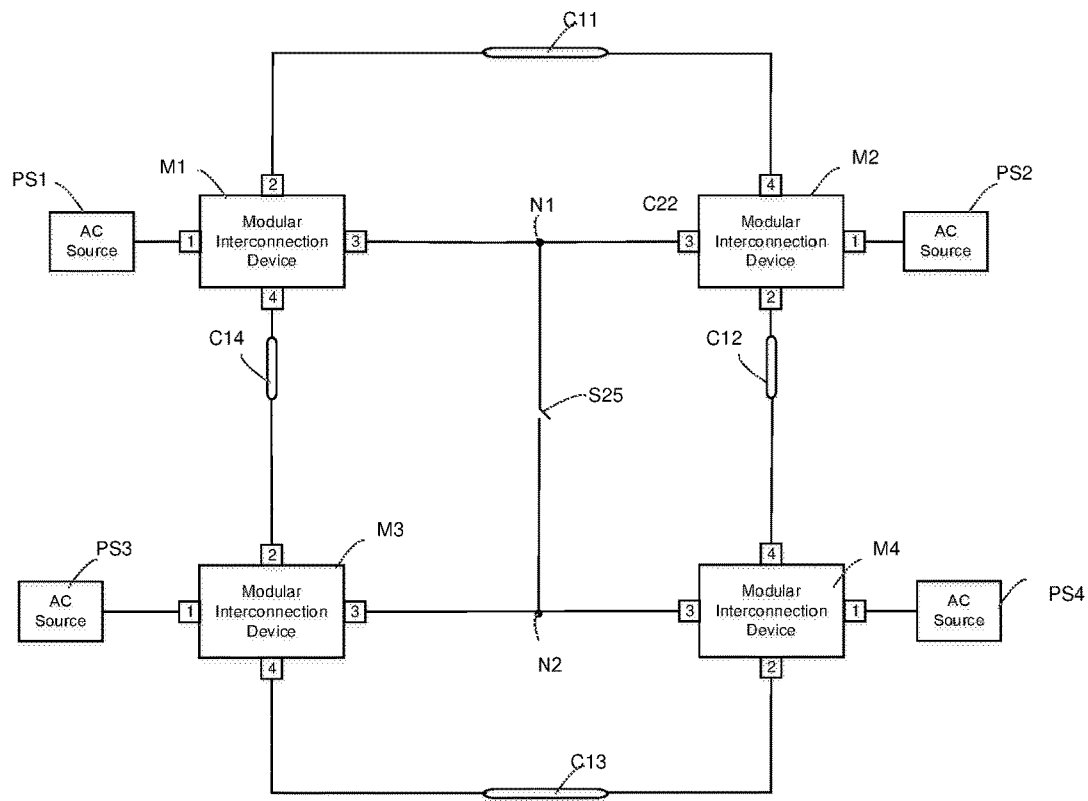
FIG. 11 illustrates a block diagram of an electrical network system of four MIDs in accordance with some further example embodiments of the present disclosure.

FIG. 11 illustrates a block diagram of an electrical network system of four MIDs in accordance with some further example embodiments of the present disclosure. The four-MID electrical network system in FIG. 11 is similar to the four-MID electrical network system in FIG. 10 except for the DC link among the MIDs. Thus, description for analogous features will be omitted here for conciseness.

The third ports of the first and second MIDs M1 and M2 are coupled to a first common node N1, and the third ports of the third and fourth MIDs M3 and M4 are coupled to a second common node N2. The first and second common nodes N1 and N2 are coupled to each other via switch S25. The switch S25 may be controlled by any of the local controller of the MIDs M1-M4 or the AC network controlling center 2. By this configuration, the MIDs M1 and M2 form a first DC pair, and the MIDs M3 and M4 form a second DC pair. In the configuration of FIG. 11, the four MIDs may be physically close to each other by a short distance. Thus, the long distance cable for the DC link may be omitted, and the third ports of the four MIDs may be coupled with short distance cable.

In an example, first DC current may be transmitted between the first DC pair of MIDs, and second DC current may be transmitted between the second DC pair of MIDs in parallel to the first DC current. In another example, DC current may be transmitted from any MID to any other MID as long as the DC switches are appropriately operated. By adding a second node, the DC current distribution may be more flexible.

Figure 12:
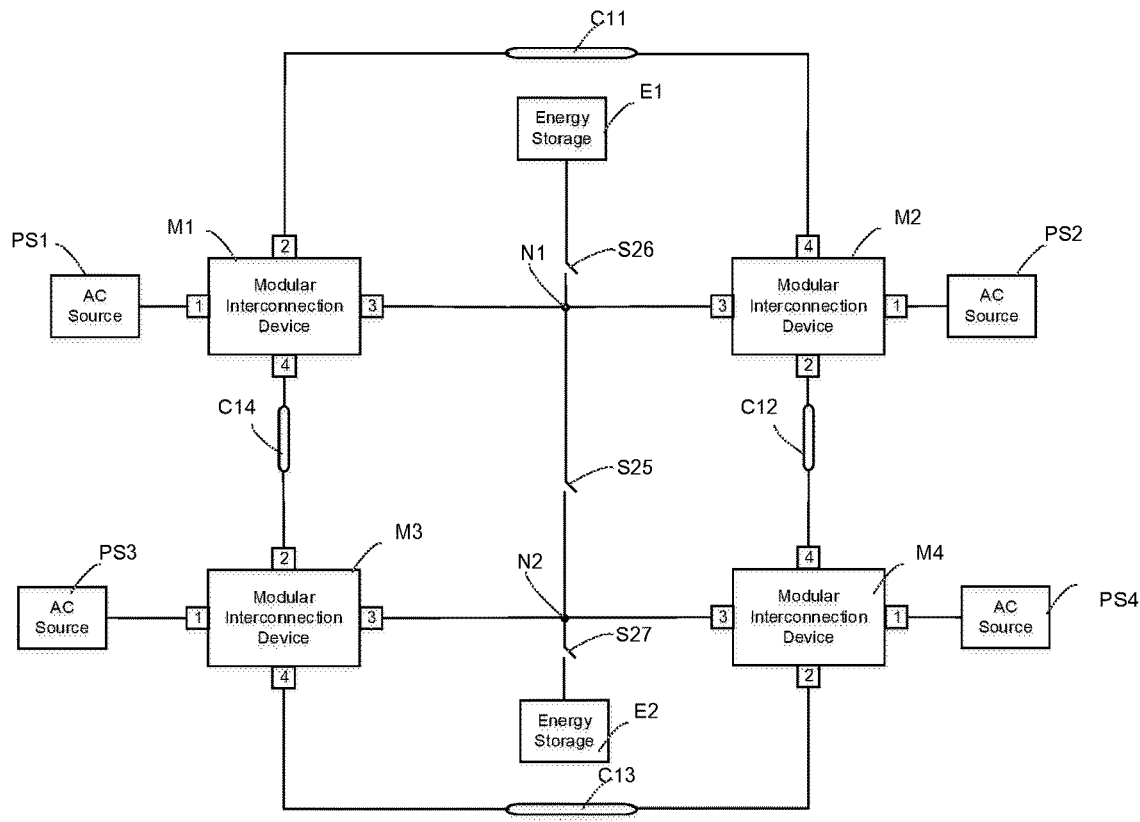
FIG. 12 illustrates a block diagram of an electrical network system of four MIDs with energy storage in accordance with some example embodiments of the present disclosure.

FIG. 12 illustrates a block diagram of an electrical network system of four MIDs with energy storage in accordance with some example embodiments of the present disclosure. The four-MID electrical network system in FIG. 12 is similar to the four-MID electrical network system in FIG. 11 except for the energy storages E1 and E2. Thus, description for analogous features will be omitted here for conciseness.

The energy storages E1 and E2 may be devices for storing DC energy, such as batteries. The first energy storage E1 is shared by the first DC pair, and the second energy storage E2 is shared by the second DC pair. In addition, the first energy storage E1 may be shared by the second DC pair by switching on the switch S25. Similarly, the second energy storage E2 may be shared by the first DC pair by switching on the switch S25.

By setting an energy storage device, it can help distribution network to achieve energy management and power flow optimization, because extra energy can be stored into the energy storage device and may be released into the DC grid when it is required.

Figure 13:
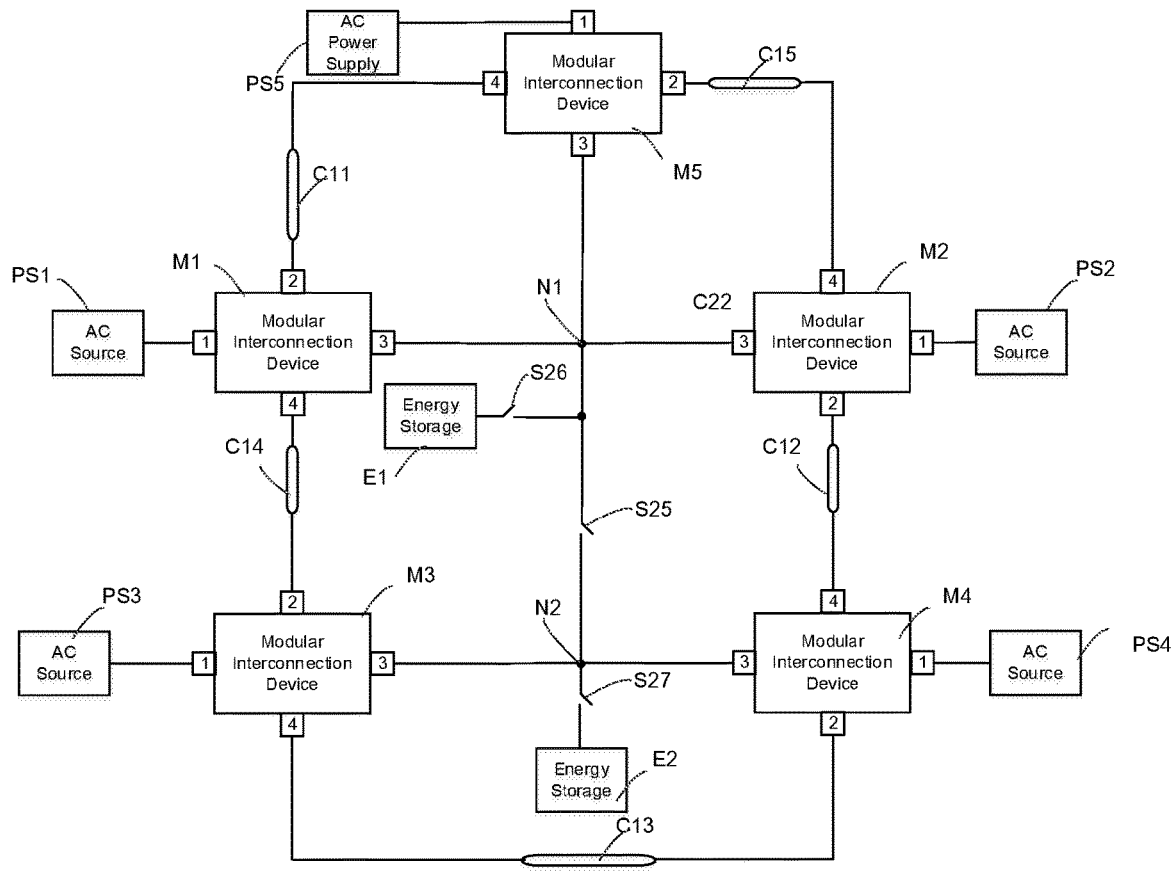
FIG. 13 illustrates a block diagram of an electrical network system of five MIDs with energy storage in accordance with some example embodiments of the present disclosure.

FIG. 13 illustrates a block diagram of an electrical network system of five MIDs with energy storage in accordance with some example embodiments of the present disclosure. The four-MID electrical network system in FIG. 12 is similar to the four-MID electrical network system in FIG. 11 except for incorporating a fifth MID M5. Thus, description for analogous features will be omitted here for conciseness.

In configuration of FIG. 13, the MIDs M1, M2 and M5 form the first DC pair, and the energy storage E1 is shared by the MIDs M1, M2 and M5. In addition, the first energy storage E1 may be shared by the second DC pair by switching on the switch S25. Similarly, the second energy storage E2 may be shared by the first DC pair by switching on the switch S25.

Although FIGS. 5-13 illustrate various configurations of electrical network systems, this is only for illustration without suggesting any limitations as to the scope of the subject matter described here. It is to be understood that other configuration topologies are possible.

Figure 14:
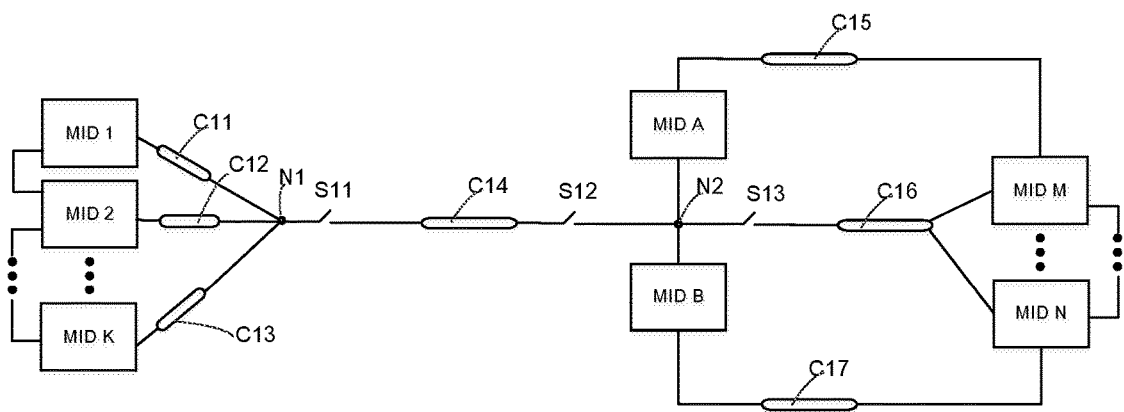
FIG. 14 illustrates a block diagram of an electrical network system of multiple MIDs in accordance with some example embodiments of the present disclosure.

For example, FIG. 14 illustrates a block diagram of an electrical network system of multiple MIDs in accordance with some example embodiments of the present disclosure. The electrical network system includes a first subsystem and a second subsystem. The first subsystem is coupled to the second subsystem via the switches S11 and S12, and the long distance cable C14 for DC link.

The first subsystem includes MID 1, MID 2 ... MID K, in which K represents a number greater than 2. The MIDs in the first subsystem may be physically close to each other, and are coupled in series such that AC current may be transmitted within the first subsystem, and DC current may be transmitted between the first and second subsystems.

The second subsystem includes MID A, MID B, MID M ... MID N, in which M represents a number greater than 0, and N represents a number greater than N. The third ports of the MIDs in the second subsystem are coupled to the common node N2, while second and four ports of the MIDs in the second subsystem are coupled in series to share AC source when necessary.

FIG. 15 illustrates a block diagram of a MID 9 in accordance with some further example embodiments of the present disclosure. The MID 9 is similar to the MID 10 in FIG. 2 except for incorporating a fifth port 25 and a fifth switch 17. Thus, description for analogous features will be omitted here for conciseness. The third switch 15 and the fifth switch 17 are both coupled to the AC/DC converter 16 for transmitting DC current, and the fifth port 25 may be included in the port assembly 20. By setting a fifth switch 17 and a fifth port 25, it will improve flexibility of DC link configuration, as described below with reference to FIGS. 16-18.

Figure 16:
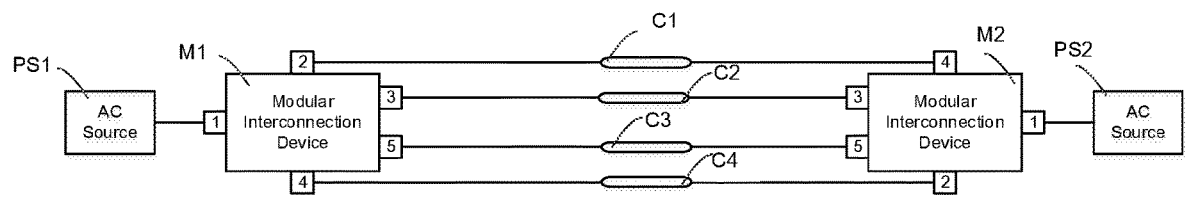
FIG. 16 illustrates a block diagram of an electrical network system of two MIDs of FIG. 15 in accordance with some example embodiments of the present disclosure.

FIG. 16 illustrates a block diagram of an electrical network system of two MIDs of FIG. 15 in accordance with some example embodiments of the present disclosure. The first ports of the first and second MIDs M1 and M2 are coupled to the AC sources PS1 and PS2, respectively. To selectively transmit AC current, the second port of the first MID M1 is coupled to the fourth port of the second MID M2, and the fourth port of the first MID M1 is coupled to the second port of the second MID M2. It could be understood that one AC link between the MIDs of the two-MID system is sufficient, and the other AC link may be a backup AC link.

The third port of the MID M1 is coupled to the third port of the MID M2 via the cable C2, and the fifth port of the MID M1 is coupled to the fifth port of the MID M2 via the cable C3. Thus, two DC links are formed between the first and second MIDs M1 and M2. By setting two DC links, the transmission efficiency may be increased in case that both DC links are used for transmitting DC current.

Figure 17:
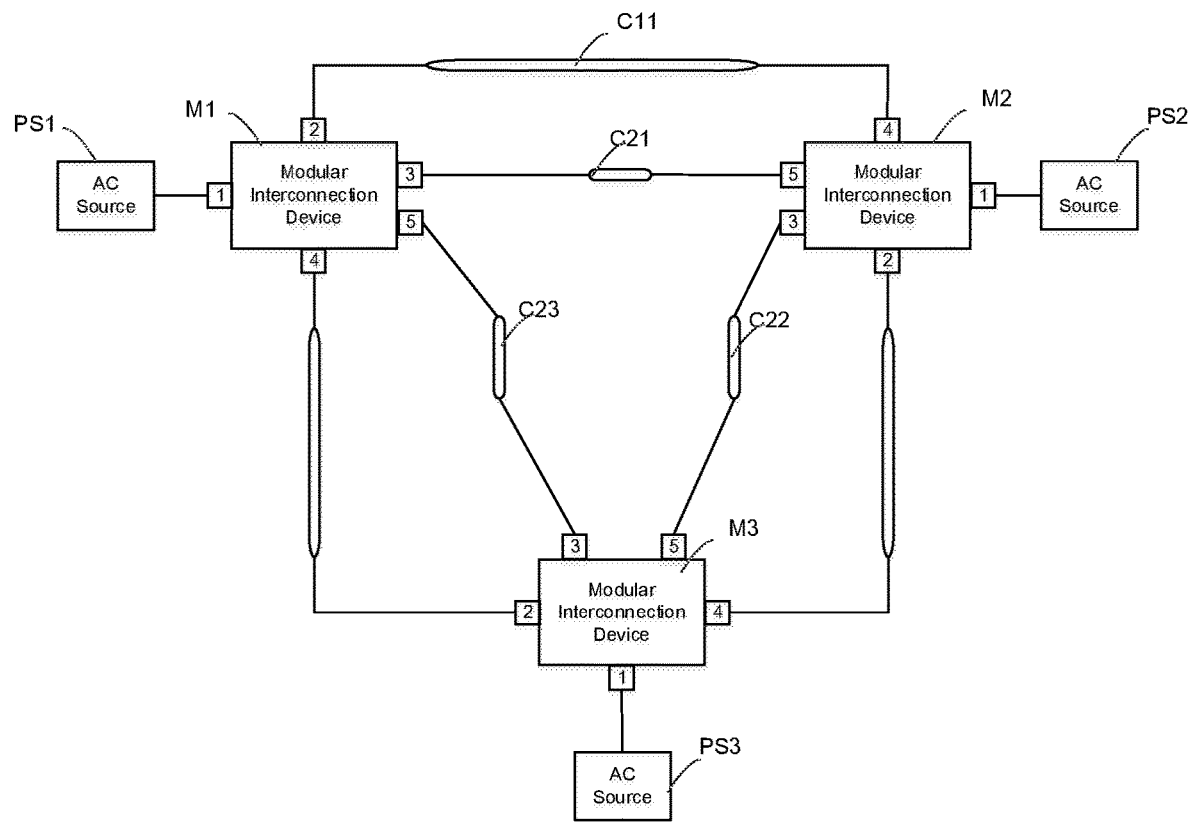
FIG. 17 illustrates a block diagram of an electrical network system of three MIDs of FIG. 15 in accordance with some example embodiments of the present disclosure.

FIG. 17 illustrates a block diagram of an electrical network system of three MIDs of FIG. 15 in accordance with some example embodiments of the present disclosure. The configuration of FIG. 17 is similar to the configuration of FIG. 7 except for the DC link topology. Thus, description for analogous features will be omitted here for conciseness.

The third port of the first MID M1 is coupled to the fifth port of the second MID M2, the third port of the first MID M2 is coupled to the fifth port of the second MID M3, and the third port of the first MID M3 is coupled to the fifth port of the second MID M1. Thus, the third and fifth ports of the first, second and third MIDs M1-M3 form a annular topology, instead of all the three MIDs being coupled to a common node in FIG. 7.

By forming a DC link between each two MIDs of the electrical network system, the transmission of DC current among the MIDs will be more flexible and easier to implement.

Figure 18:
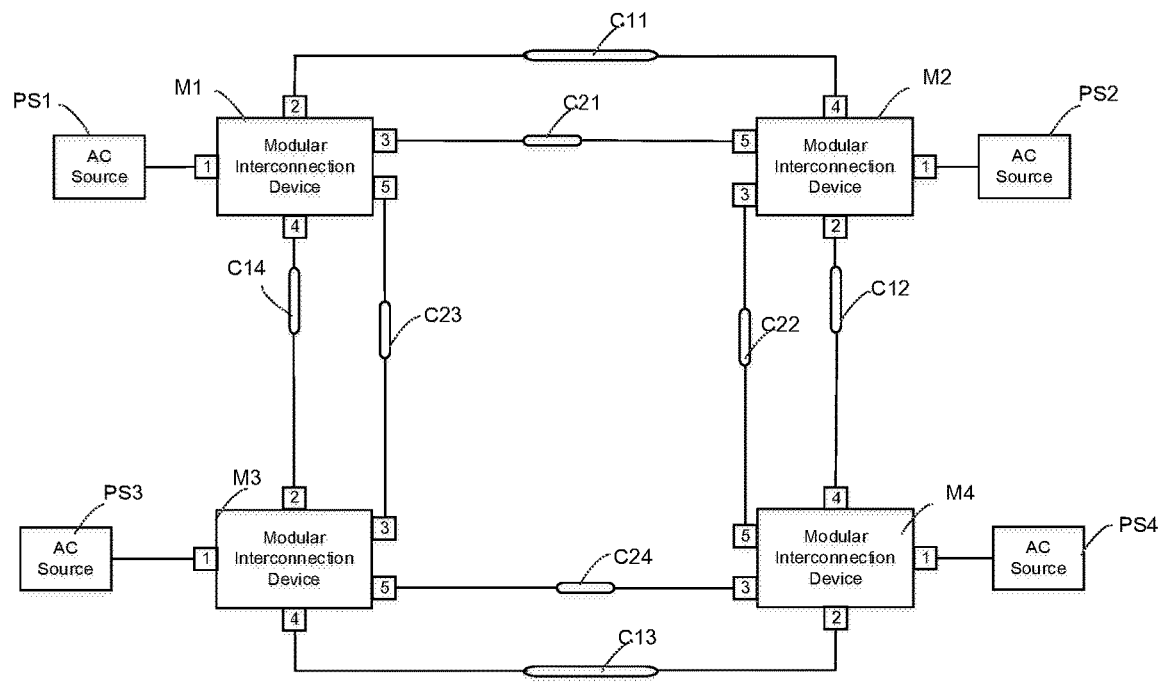
FIG. 18 illustrates a block diagram of an electrical network system of four MIDs of FIG. 15 in accordance with some example embodiments of the present disclosure.

FIG. 18 illustrates a block diagram of an electrical network system of four MIDs of FIG. 15 in accordance with some example embodiments of the present disclosure. The configuration of FIG. 18 is similar to the configuration of FIG. 8 except for the DC link topology. Thus, description for analogous features will be omitted here for conciseness.

The third port of the first MID M1 is coupled to the fifth port of the second MID M2, the third port of the first MID M2 is coupled to the fifth port of the second MID M4, the third port of the first MID M4 is coupled to the fifth port of the second MID M3, and the third port of the first MID M3 is coupled to the fifth port of the second MID M1. Thus, the third and fifth ports of the first, second and third MIDs M1-M3 form a annular topology, instead of all the three MIDs being coupled to a common node in FIG. 8.

Similarly, by forming a DC link between each two adjacent MIDs of the electrical network system, the transmission of DC current among the MIDs will be more flexible and easier to implement.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A modular interconnection device, comprising:
a modular port assembly configured to transmit alternating current (AC) and/or direct current (DC);
a node coupled to an AC source via a first switch and to the modular port assembly, the first switch being configured to selectively disconnect the modular interconnection device from the AC source;
a converter coupled to the node via a second switch and coupled to a DC source via a third switch, the converter configured to convert the AC current into DC current or convert DC current into AC current; and
a local controller coupled to the first, second and third switches and configured to control operation of the first, second and third switches.

2. The modular interconnection device of claim 1, wherein:
the modular interconnection device is configured to couple to a further modular interconnection device and to transmit electricity to or receive electricity from the further modular interconnection device; and
the local controller of the modular interconnection device is configured to communicate with a local controller of the further modular interconnection device or to a controlling center of a power supply network.

3. The modular interconnection device of claim 1, wherein the first switch is coupled between the modular port assembly and the node.

4. The modular interconnection device of claim 3, wherein;
the node is further coupled to the modular port assembly via a fourth switch; and
the local controller is further coupled to the fourth switch and configured to control operation of the fourth switch.

5. The modular interconnection device of claim 4, further comprising a fifth switch, the fifth switch being coupled to a cable and the local controller and configured to selectively disconnect the cable from the DC sources.

6. The modular interconnection device of claim 4, wherein the local controller is further configured to switch on the fourth switch in response to receiving a request of a further AC source or a further converter to transmit AC current.

7. The modular interconnection device of claim 4, wherein the local controller is further configured to switch on the fourth switch and switch off the first switch in response to receiving a request of converting reactive AC current from a further AC source.

8. The modular interconnection device of claim 7, wherein the local controller is further configured to switch on the fifth switch in response to receiving a request for receiving DC current from or transmitting DC current to a further modular interconnection device.

9. The modular interconnection device of claim 3, wherein the modular port assembly comprises:
a first port coupled to the first switch and configured to receive the AC current from the AC source or to transmit AC current to the AC source;
a second port coupled to the node directly or via a fourth switch and configured to selectively transmit the AC current between modular interconnection devices;
a third port coupled to the third switch and configured to selectively transmit the DC current between the modular interconnection devices; and
a fourth port coupled to the node and configured to transmit the AC current between the modular interconnection devices.

10. The modular interconnection device of claim 9, further comprising:
a fifth switch coupled to the converter and configured to disconnect the converter from DC sources; and
wherein the modular port assembly comprises a fifth port coupled to the fifth switch and configured to transmit the DC current between the modular interconnection devices, the local controller being further coupled to the fifth switch and configured to control operation of the fifth switch.

11. The modular interconnection device of claim 1, wherein the local controller is integrated in the converter.

12. The modular interconnection device of claim 1, wherein the local controller is further configured to switch off the first switch in response to receiving information indicating fault of the AC source.

13. The modular interconnection device of claim 1, wherein the local controller is further configured to switch off the second switch in response to receiving information indicating fault of the converter.

14. The modular interconnection device of claim 1, wherein the local controller is further configured to switch on the third switch in response to receiving a request for transmitting DC current from the modular interconnection device to a further modular interconnection device or receiving DC current from the further modular interconnection device to the modular interconnection device.

15. The modular interconnection device of claim 1, wherein the local controller is further configured to control the converter to receive or transmit the DC current based on a load redistribution request.

16. An electrical network system, comprising:
a first modular interconnection device comprising:
a first modular port assembly configured to transmit alternating current (AC) and/or direct current (DC);
a first node coupled to an AC source via a first switch and to the first modular port assembly, the first switch being configured to selectively disconnect the first modular interconnection device from the AC source;
a first converter coupled to the first node via a second switch and coupled to a DC source via a third switch, the first converter configured to convert the AC current into DC current or convert DC current into AC current; and
a first local controller coupled to the first, second and third switches and configured to control operation of the first, second and third switches; and
a second modular interconnection device selectively coupled to the first modular interconnection device, the second modular interconnection device comprising:
a second modular port assembly configured to transmit alternating current (AC) and/or direct current (DC);
a second node coupled to the AC source via a fourth switch and to the second modular port assembly, the fourth switch being configured to selectively disconnect the second modular interconnection device from the AC source;
a second converter coupled to the second node via a fifth switch and coupled to the DC source via a sixth switch, the second converter configured to convert the AC current into DC current or convert DC current into AC current; and a second local controller coupled to the fourth, fifth and sixth switches and configured to control operation of the fourth, fifth and sixth switches;

wherein the electrical network system is configured to transmit electrical power between the first modular interconnection device and the second modular interconnection device.

17. The electrical network system of claim 16, wherein the first and second modular port assemblies each comprise:

a first port coupled to the respective first or fourth switch and configured to receive the AC current from the AC source or to transmit AC current to the AC source;

a second port coupled to the respective first or second node and configured to selectively transmit the AC current between first and second modular interconnection devices;

a third port coupled to the respective third or sixth switch and configured to selectively transmit the DC current between the first and second modular interconnection devices; and a fourth port coupled to the respective first or second node and configured to transmit the AC current between the first and second modular interconnection devices; and wherein the second port of the first modular interconnection device is selectively coupled to the fourth port of the second modular interconnection device.

18. The electrical network system of claim 17, wherein the third port of the first modular interconnection device is selectively coupled to the third port of the second modular interconnection device.

19. The electrical network system of claim 16, further comprising a third modular interconnection device comprising:

a third modular port assembly configured to transmit alternating current (AC) and/or direct current (DC);

a third node coupled to the AC source via a seventh switch and to the third modular port assembly, the third switch being configured to selectively disconnect the third modular interconnection device from the AC source;

a third converter coupled to the third node via a eighth switch and coupled to the DC source via a ninth switch, the third converter configured to convert the AC current into DC current or convert DC current into AC current; and a third local controller coupled to the seventh, eighth, and ninth switches and configured to control operation of the seventh, eighth, and ninth switches;

wherein the first, second and third modular port assemblies each comprise:

a first port coupled to the respective first, fourth or seventh switch and configured to receive the AC current from the AC source or to transmit AC current to the AC source;

a second port coupled to the respective first, second or third node and configured to selectively transmit the AC current between first, second, and third modular interconnection devices;

a third port coupled to the respective third, sixth or ninth switch and configured to selectively transmit the DC current between the first, second, and third modular interconnection devices; and a fourth port coupled to the respective first, second, or third node and configured to transmit the AC current between the first, second, and third modular interconnection devices; and wherein the second and fourth ports of the first, second and third modular interconnection devices are coupled in an annular topology.

20. The electrical network system of claim 19, wherein the third ports of the first, second and third modular interconnection devices are coupled to a common node.

21. The electrical network system of claim 19, wherein:

the first node is further coupled to the first modular port assembly via a tenth switch;

the first local controller is further configured to switch on the tenth switch in response to receiving a request of a further AC source or a further converter to transmit AC current;

the second local controller is further configured to switch on the sixth switch in response to receiving a request for transmitting DC current from the second modular interconnection device to a further modular interconnection device or receiving DC current from the further modular interconnection device to the modular interconnection device;

the third node is further coupled to the third modular port assembly via an eleventh switch;

the third local controller is further configured to switch on the eleventh switch in response to receiving a request of a further AC source or a further converter to transmit AC current; and the third and fifth ports of the first modular interconnection device, the second modular interconnection device, and the third modular interconnection device are coupled in an annular topology.

22. The electrical network system of claim 16, further comprising an energy storage device coupled to a third port of the first or second modular interconnection device, the third port coupled to the respective third or sixth switch and configured to selectively transmit the DC current between the first and second modular interconnection devices.

* * * * *